United States Patent

[11] 3,593,163

[72] Inventors Remi Quet
Hardy Mantes-la-Ville;
Marc Jules Theodore Schneider, Versailles,
both of, France
[21] Appl. No. 804,885
[22] Filed Mar. 6, 1969
[45] Patented July 13, 1971
[73] Assignee International Standard Electronic Corporation
New York,

[54] ANALOG MULTIPLIER
6 Claims, 5 Drawing Figs.
[52] U.S. Cl. .................................................. 328/160,
328/151
[51] Int. Cl. .................................................... G06g 7/16
[50] Field of Search ........................................... 328/160,
151, 167; 235/194, 161

[56] References Cited
UNITED STATES PATENTS
3,307,408 3/1967 Thomas et al. ............... 328/167 X
3,363,188 1/1968 Gardere ....................... 328/160 X

*Primary Examiner*—John S. Heyman
*Assistant Examiner*—B. P. Davis
*Attorneys*—C. Cornell Remsen, Jr., Walter J. Baum, Percy P. Lantzy, Philip M. Bolton, Isidore Togut and Charles L. Johnson, Jr.

ABSTRACT: An analog circuit to multiply signal $f(t)$ by a signal $g(t)$, where signal $g(t)$ has limited duration and zero as its initial and final amplitudes. $f(t)$ is sampled at a first predetermined frequency. The resultant PAM is filtered by a first filter having a predetermined impulse response proportional to $g(t)$. The output of the first filter is sampled at a second predetermined frequency different than the first sampling frequency. The result of the second sampling is filtered by a low pass filter having a predetermined cutoff frequency. The first and second predetermined frequency, the predetermined impulse response and the predetermined cutoff frequency determine the precision of the resultant product.

PATENTED JUL 13 1971 3,593,163

Inventors
RÉMI QUET
MARC J. T. SCHNEIDER
By Alfred C. Hill
Agent

ANALOG MULTIPLIER

BACKGROUND OF THE INVENTION

The present invention relates to a circuit enabling the multiplication of a signal varying with time by a signal of limited duration, the initial and final amplitudes of which are zero.

The problem of the modulation or of the multiplication of an analog signal by another analog signal has been solved in various ways. One of the solutions consists in using, for instance, diodes which, for low currents have an output voltage which is a logarithmic function of the current. The multiplication is then reduced to the addition of logarithms. The precision obtained by means of such a method is small. Also the reproducibility of such a circuit is difficult.

The precision and the reproducibility may be obtained by carrying out the multiplication in a digital form. However, the number of logical circuits involved is very big. Furthermore, the speed of multiplication is rather low.

SUMMARY OF THE INVENTION

The object of the present invention is thus to achieve a multiplier circuit which is precise and reproducible, while at the same time being simple.

A feature of the present invention is the provision of an analog multiplier of a signal $f(t)$ by a signal $g(t)$ having a limited duration and a zero or practically zero initial and final amplitude comprising a source of signal $f(t)$; first means coupled to the source to sample signal $f(t)$ at a first predetermined frequency; a first filter coupled to the first means having a predetermined impulse response proportional to signal $g(t)$; a second means coupled to the first filter to sample the output signal of the first filter at a second predetermined frequency different than the first frequency; and a second filter coupled to the second means having a given cutoff frequency to provide the product output signal of the multiplier.

Another feature of the present invention is the provision of a circuit enabling to multiply a signal $f(t)$ by a signal $g(t)$ having a limited duration and initial and final amplitudes of zero or practically zero comprising a first sampling circuit to sample the signal $f(t)$ by short pulses of period $T$ corresponding to a frequency at least equal to twice the maximum frequency of the frequency spectrum of signal $f(t)$; a filter the pulse response of which is $g[(k+1)t]$, the duration of this response being lower than $T$ and $k$ being very big with respect to one; a second sampling circuit sampling the output signal of the filter by short pulses of period $T(1+1/k)$; and a low pass filter to which are applied the output pulses of this second sampling circuit having a cutoff frequency of:

$$\frac{1}{2T\left(1+\frac{1}{k}\right)}.$$

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

The present invention relates to a unique analog multiplier described in greater detail hereinbelow in that two analog signals $f(t)$ and $g(t)$ are not each supplied from an external source to be multiplied together. Rather an output signal proportional to $f(t) \cdot g(t)$ is obtained in the circuit of this invention by sampling an input signal $f(t)$ at a first predetermined rate. This sampled input signal $f(t)$ is then applied to a filter having an impulse response of predetermined characteristic and proportional to $g(t)$. The output signal of this filter is then sampled by a signal at a second predetermined rate. This second sampled signal is then passed through a low pass filter having a predetermined cutoff frequency. The resultant signal at the output of the low pass filter is a signal that is proportional to $f(t)^a g(t)$.

Figure 1:
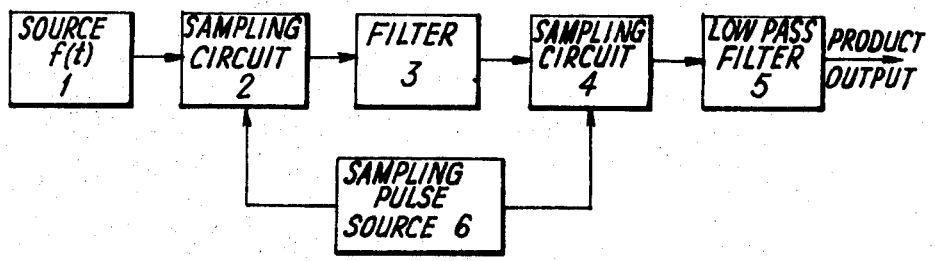
FIG. 1 is a block diagram of the circuit in accordance with the principles of the present invention.
Figure 2A:
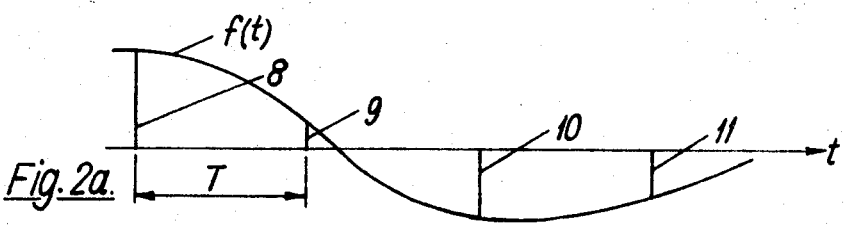
FIGS. 2a, 2b, 2c represent diagrams of signals enabling to understand the operation of the circuit of FIG. 1.
Figure 2B:
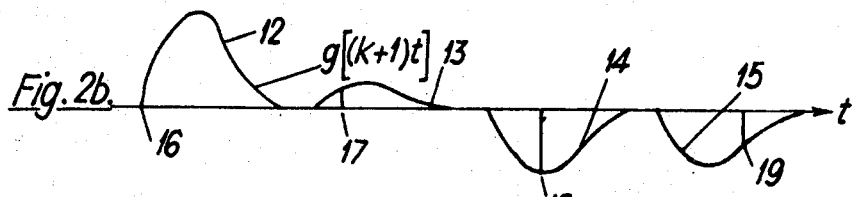

FIG. 1 illustrates a block diagram of a circuit multiplying a signal $f(t)$ supplied by source 1 by a signal $g(t)$ having limited duration and initial and final amplitudes of zero. The signal $f(t)$ shown on FIG. 2a, is applied to sampling circuit 2 which samples signal $f(t)$ by short pulses of period $T$ from sampling pulse source 6. This period $T$ is such that the corresponding frequency $F=1/T$ is at least equal to twice the maximum frequency of the frequency spectrum of signal $f(t)$. The amplitude modulated pulses 8, 9, 10, 11 (FIG. 2a) resulting from this first sampling are applied to filter 3 having an impulse response which in relation to time is expressed in the form of a function $g[(k+1)t]$, where $k$ is a number higher than one. Since the amplitude of the pulses applied to filter 3 is given by $f(nT)$, the amplitude of the pulses 12, 13, 14, 15 (FIG. 2b) coming out of filter 3 are expressed by $f(nT) \cdot g[(k+1)t]$.

It will be observed that the impulse response of filter 3 must be such that it is zero or practically zero at the instants $nT$ and also that its duration is less than the period $T$.

The output pulses 12, 13, 14, 15 of filter 3 are applied to a second sampling circuit 4 which samples these pulses by short pulses of period $T(1+1/k)$ from sampling pulse source 6. The pulses 16, 17, 18, 19 resulting from this second sampling correspond to the instants $t=nT(1+1/k)-nT=nT/k$ of the signal $f(nT^a g[(K+1)t]$ and, thus, have an amplitude given by $$f(nT) \cdot g\left[(k+1)\frac{nT}{k}\right].$$

Figure 2C:
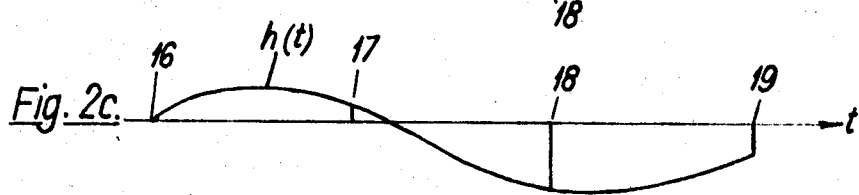
Figure 3:
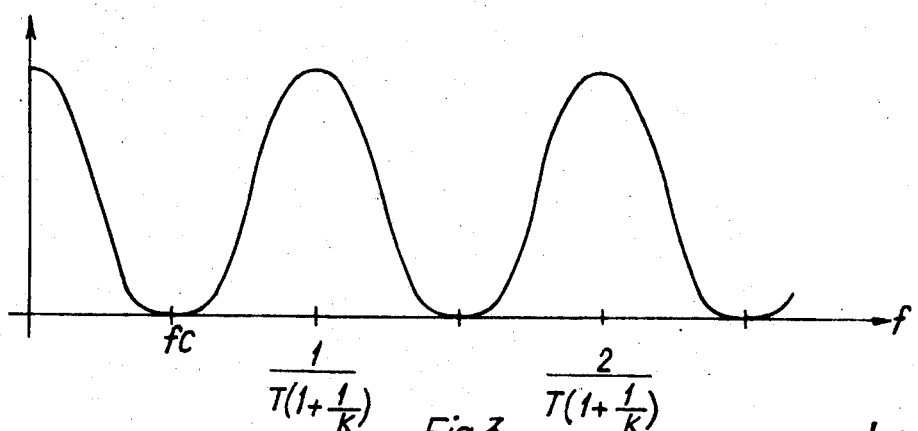
FIG. 3 represents the frequency spectrum of the output signal of sampling circuit 4 of FIG. 1.

These pulses 16, 17, 18, 19 may be considered as resulting from the sampling of a signal $h(t)$ (FIG. 2c) at the instants $nT(1+1/k)$, i.e.:

$$h\left[nT\left(1+\frac{1}{k}\right)\right] = f(nT) \cdot g\left[(k+1)\frac{nT}{k}\right]$$

which may be written as $$h(t) = f\left[\frac{kt}{k+1}\right] \cdot g(t). \text{ where } nT\left(1+\frac{1}{k}\right) = t.$$

It will be observed that the signal $h(t)$ is not exactly the product of the functions $f(t)$ and $g(t)$. However, owing to the value of $k$ with respect to one, for instance, $k=10,000$, it can be considered that $$f\left[\frac{kt}{k+1}\right]$$

is substantially equal to $f(t)$. If such was not the case, the signal $f(t)$ would be applied to a circuit modifying the time scale of the said signal in order to obtain the signal $$f\left[\frac{k+1}{kt}\right].$$

In order to obtain the envelope $h(t)$ of the pulses 16, 17, 18, 19, these pulses are applied to low pass filter 5 having a cutoff frequency $$fc = \frac{1}{2T\left(1+\frac{1}{k}\right)},$$

In effect, the frequency spectrum of pulses 16, 17, 18, 19 is constituted by lines at the frequencies $$\frac{1}{T\left(1+\frac{1}{k}\right)},$$

, the envelope of the said lines being given by the Fourier transform of $h(t)$. Thus, each line contains the information enabling the reconstitution of the envelope so that by filtering one of them, for instance, the first one, the output signal of the filter is $h(t)$.

It will be observed that such a reconstitution of the envelope is possible only if the spectrum lines do not overlap, i.e., if the spectrum width of the lines is lower than the repetition frequency $$\frac{1}{T\left(1+\frac{1}{k}\right)}$$

of the second sampling.

To sum up, the correct operation of the circuit of FIG. 1 imposes three conditions. The first condition is that the frequency $F$ of the first sampling should be at least equal to twice the maximum frequency fmax of the frequency spectrum of $f(t)$. The second condition concerns the duration of the pulse response $g[(k+1)t]$ which must be lower than the period $T$. The third condition concerns the width of the spectrum lines of the pulses resulting from the second sampling, the said width having to be less than $$\frac{1}{T\left(1+\frac{1}{k}\right)}.$$

These three conditions enable the determination of the values of $T$ and $k$.

The circuit of FIG. 1 has been described by assuming that the function $f$ was available in the form of a time function. However, it is clear that the circuit is also suitable when $f$ is a function of any variable, $x$, for instance. It is then necessary to make provision in this case for a circuit transforming $f(x)$ into a variable voltage in relation with time $f(t)$. As far as the function $g$ is concerned, it should be possible to put it in the form of the pulse response of a filter.

In one application of the analog multiplier of this invention, it is used for simulating output signals of a coherent pulse-doppler radar by taking account of the amplitude modulation due to the shape of the radiation pattern when the antenna beam is passing over the target. In such a simulator, the signal $f(t)$ is a sine wave signal corresponding to the doppler frequency signal and signal $g(t)$ corresponds to the main lobe of the antenna beam said main lobe having a limited duration and zero initial and final amplitudes. In addition, the main lobe can be approximated by a known curve, such as a cosine squared or a Gaussian curve, which can be easily obtained by proper design of a filter, such as filter 3.

While we have described above the principles of our invention in connection with specific apparatus, it is to be clearly understood that this description is made only by way of example and not as a limitation of the scope of our invention as set forth in the objects thereof and in the accompanying claims.

We claim:

1. An analog multiplier of a signal $f(t)$ by a signal $g(t)$ having a limited duration and a zero initial and final amplitude comprising:
    a source of said signal $g(t)$;
    first means coupled to said source to sample said signal $g(t)$ at a first predetermined frequency;
    a first filter coupled to said first means having a predetermined impulse response proportional to said signal $g(t)$;
    a second means coupled to said first filter to sample the output signal of said first filter at a second predetermined frequency different than said first frequency; and
    a second filter coupled to said second means having a given cutoff frequency to provide the product output signal of said multiplier.

2. A multiplier according to claim 1, wherein
    said first means includes
    a sampling circuit coupled to said source, and
    a source of sampling pulses coupled to said sampling circuit, said first frequency equaling $F=1/T$, where $F$ is a frequency at least equal to twice the maximum frequency of the frequency spectrum of said signal $g(t)$ and $T$ is the period of $F$.

3. A multiplier according to claim 1, wherein
    said impulse response equals $g[(k+1)t]$ and has a duration less than $T$, where $k$ is an integer greater than one and $T$ is the period of frequency $F$ which is equal to at least twice the maximum frequency of the frequency spectrum of said signal $g(t)$.

4. A multiplier according to claim 1, wherein
    said second means includes
    a sampling circuit coupled to said first filter, and
    a source of sampling pulses coupled to said sampling circuit,
    said second frequency equaling $$\frac{1}{T\left(1+\frac{1}{k}\right)},$$

where $k$ is an integer greater than one and $T$ is the period of frequency $F$ which is equal to at least twice the maximum frequency of the frequency spectrum of said signal $f(t)$.

5. A multiplier according to claim 1, wherein
    said given cutoff frequency equals $$\frac{1}{2T\left(1+\frac{1}{k}\right)},$$

where $k$ is an integer greater than one and $T$ is the period of frequency $F$ which is equal to at least twice the maximum frequency of the frequency spectrum of said signal $g(t)$.

6. A multiplier according to claim 1, wherein
    said first means includes
    a first sampling circuit coupled to said source, and
    a first source of sampling pulses coupled to said first sampling circuit,
    said first frequency equaling $F=1/T$, where $F$ is a frequency at least equal to twice the maximum frequency of the frequency spectrum of said signal $g(t)$ and $T$ is the period of $F$;
    said first filter is coupled to the output of said first sampling circuit and said impulse response equals $g[(k+1)t]$ and has a duration less than $T$, wherein $k$ is an integer greater than one;
    said second means includes
    a second sampling circuit coupled to said filter, and
    a second source of sampling pulses coupled to said second sampling circuit,
    said second frequency equaling $$\frac{1}{T\left(1+\frac{1}{k}\right)};$$

and
    said second filter is coupled to the output of said second sampling circuit and said given cutoff frequency equals $$\frac{1}{2T\left(1+\frac{1}{k}\right)}.$$